United States Patent
Sullivan et al.

(10) Patent No.: US 9,852,215 B1
(45) Date of Patent: Dec. 26, 2017

(54) IDENTIFYING TEXT PREDICTED TO BE OF INTEREST

(71) Applicants: Todd H. Sullivan, Seattle, WA (US); Thomas F. Dimson, Seattle, WA (US)

(72) Inventors: Todd H. Sullivan, Seattle, WA (US); Thomas F. Dimson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 242 days.

(21) Appl. No.: 13/624,628

(22) Filed: Sep. 21, 2012

(51) Int. Cl.
G06F 17/00 (2006.01)
G06F 17/30 (2006.01)

(52) U.S. Cl.
CPC .............................. G06F 17/30731 (2013.01)

(58) Field of Classification Search
CPC .................................................. G06F 17/30731
See application file for complete search history.

(56) References Cited

U.S. PATENT DOCUMENTS

| | | | |
|---|---|---|---|
| 6,377,956 B1 * | 4/2002 | Hsu et al. | |
| 6,990,628 B1 * | 1/2006 | Palmer et al. | 715/234 |
| 8,156,115 B1 * | 4/2012 | Erol et al. | 707/728 |
| 8,935,265 B2 * | 1/2015 | Tang | G06F 17/30722 707/754 |
| 2001/0042087 A1 * | 11/2001 | Kephart et al. | 707/530 |
| 2004/0117363 A1 * | 6/2004 | Ohno | 707/3 |
| 2005/0022106 A1 * | 1/2005 | Kawai et al. | 715/500 |
| 2005/0060643 A1 * | 3/2005 | Glass et al. | 715/501.1 |
| 2007/0073745 A1 * | 3/2007 | Scott et al. | 707/100 |
| 2007/0150801 A1 * | 6/2007 | Chidlovskii | G06F 17/2247 715/210 |
| 2007/0282824 A1 * | 12/2007 | Ellingsworth | 707/5 |
| 2008/0107338 A1 * | 5/2008 | Furmaniak | G06K 9/00469 382/176 |
| 2008/0114756 A1 * | 5/2008 | Konig | G06F 17/30867 |
| 2008/0228749 A1 * | 9/2008 | Brown | G06F 17/30796 |
| 2009/0094178 A1 * | 4/2009 | Aoki | 706/20 |
| 2009/0157572 A1 * | 6/2009 | Chidlovskii | G06N 99/005 706/12 |
| 2010/0145927 A1 * | 6/2010 | Kasbekar et al. | 707/710 |
| 2010/0208984 A1 * | 8/2010 | Bilenko | G06Q 30/0256 382/161 |
| 2010/0262659 A1 * | 10/2010 | Christiansen et al. | 709/205 |
| 2011/0004573 A1 * | 1/2011 | Chitiveli et al. | 706/12 |
| 2011/0047168 A1 * | 2/2011 | Ellingsworth | 707/749 |
| 2011/0178981 A1 * | 7/2011 | Bowen | G06Q 10/00 707/608 |

(Continued)

*Primary Examiner* — Tarek Chbouki
(74) *Attorney, Agent, or Firm* — Lee & Hayes, PLLC

(57) ABSTRACT

A body of text may be compared with one or more user-selected text portions to rank a plurality of text portions of the body of text, such as for predicting which of the text portions are likely to be annotated by users. As one example, the text of a content item may be compared with excerpts of other content items that have been highlighted or otherwise annotated by a plurality of users. Based at least in part on the comparison, some implementations identify one or more portions of text of the content item that are likely to be selected or highlighted by users that access the content item. In some examples, a classifier may be trained based on popular highlights determined for a plurality of content items. The classifier may be applied to a body of text to determine portions that users are likely to consider profound or interesting.

28 Claims, 11 Drawing Sheets

(56) References Cited

U.S. PATENT DOCUMENTS

| | | | |
|---|---|---|---|
| 2011/0218946 A1* | 9/2011 | Stern | H04L 12/1859 706/12 |
| 2012/0072859 A1* | 3/2012 | Wang | G06K 9/00442 715/764 |
| 2012/0084155 A1* | 4/2012 | Roy | G06Q 30/0273 705/14.69 |
| 2013/0018824 A1* | 1/2013 | Ghani | G06N 99/005 706/12 |
| 2013/0159348 A1* | 6/2013 | Mills | G06F 17/30731 707/777 |
| 2013/0159826 A1* | 6/2013 | Mason | G06F 17/30873 715/205 |
| 2013/0204885 A1* | 8/2013 | Clinchant | G06K 9/4676 707/756 |
| 2014/0040256 A1* | 2/2014 | White-Sullivan | G06F 17/30029 707/734 |

* cited by examiner

900

```
┌─────────────────────────────────────────────────────────────┐
│ TRAIN A CLASSIFIER BASED AT LEAST IN PART ON TRAINING DATA THAT │
│   INCLUDES FIRST TEXT PORTIONS THAT HAVE BEEN IDENTIFIED BY A  │
│  PLURALITY OF USERS, THE FIRST TEXT PORTIONS CORRESPONDING TO  │
│              A PLURALITY OF FIRST CONTENT ITEMS                │
│                             902                                │
└─────────────────────────────────────────────────────────────┘
                              │
                              ▼
┌─────────────────────────────────────────────────────────────┐
│  APPLY THE CLASSIFIER TO TEXT OF A SECOND CONTENT ITEM, THE   │
│     TEXT INCLUDING A PLURALITY OF SECOND TEXT PORTIONS        │
│                             904                                │
└─────────────────────────────────────────────────────────────┘
                              │
                              ▼
┌─────────────────────────────────────────────────────────────┐
│  DETERMINE A RANKING OF THE SECOND TEXT PORTIONS BASED AT    │
│    LEAST IN PART ON A SIMILARITY TO THE FIRST TEXT PORTIONS   │
│                             906                                │
└─────────────────────────────────────────────────────────────┘
                              │
                              ▼
┌─────────────────────────────────────────────────────────────┐
│  DETERMINE THE SIMILARITY BASED AT LEAST IN PART ON AT LEAST  │
│ ONE OF A SIMILARITY OF SENTENCE STRUCTURE BETWEEN THE FIRST   │
│       TEXT PORTIONS AND THE SECOND TEXT PORTIONS, OR          │
│     A SIMILARITY OF A TYPE OF WORDS USED IN THE FIRST TEXT    │
│   PORTIONS WITH A TYPE OF WORDS USED IN THE SECOND TEXT       │
│                          PORTIONS                              │
│                             908                                │
└─────────────────────────────────────────────────────────────┘
                              │
                              ▼
┌─────────────────────────────────────────────────────────────┐
│   SELECT AT LEAST ONE SECOND TEXT PORTION FROM THE SECOND    │
│            CONTENT ITEM BASED ON THE RANKING                  │
│                             910                                │
└─────────────────────────────────────────────────────────────┘
```

FIG. 9

IDENTIFYING TEXT PREDICTED TO BE OF INTEREST

BACKGROUND

The continued proliferation of digital content items has led to an increase in the availability of such content items, as well as an increase in the availability of electronic devices and applications used for consuming these content items. For instance, users may consume textual content items, such as electronic books (eBooks) and other types of content items on an assortment of electronic devices. As the number of content items and devices for consuming content items continues to increase, users are ever more interested in enhancing their experiences while acquiring and consuming these content items. Further, content providers continue to seek ways to provide information about content items to users.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 9 is a flow diagram illustrating an example process to identify text predicted to be of interest to users according to some implementations.

DETAILED DESCRIPTION

Figure 1:
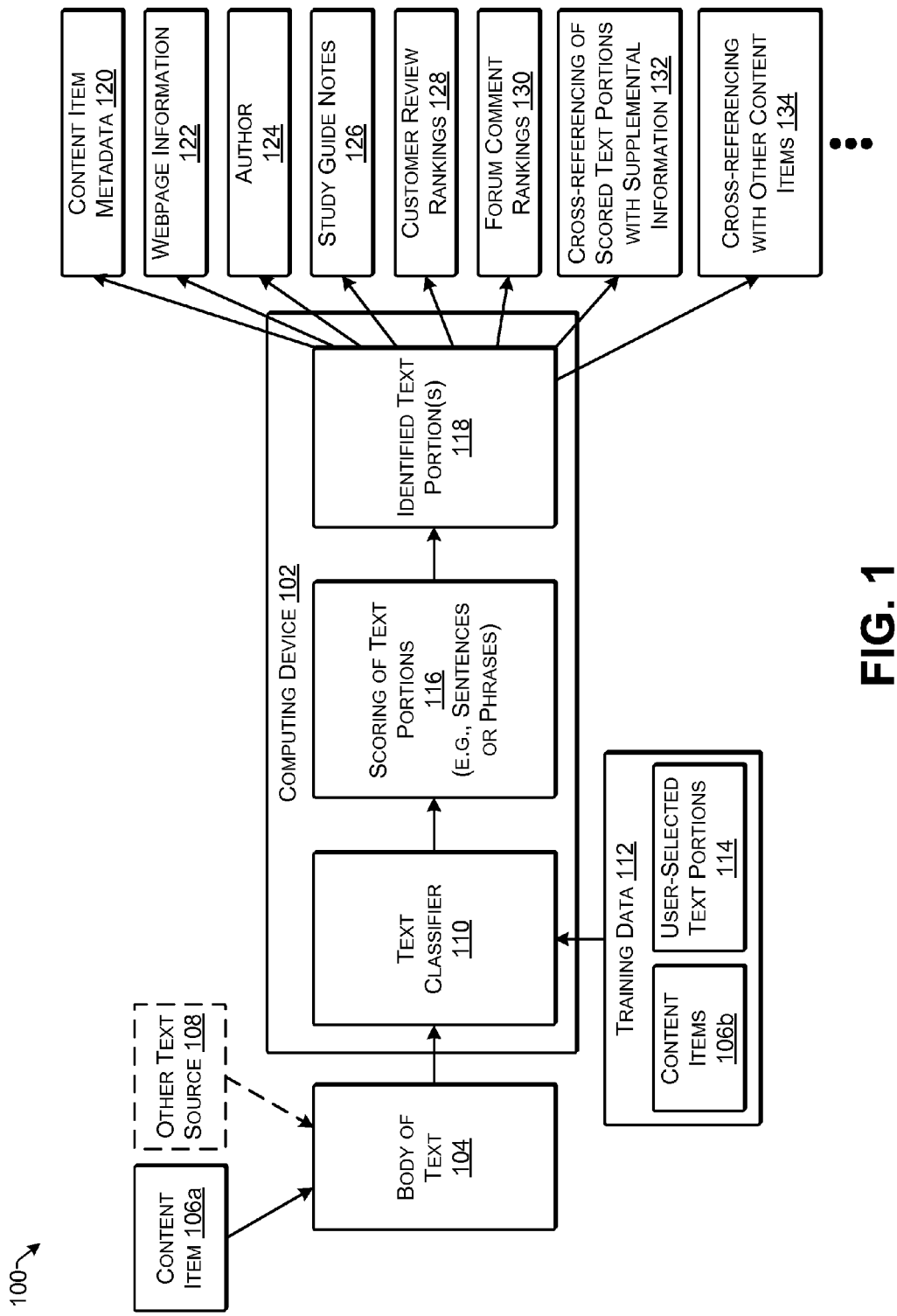
FIG. 1 illustrates an example framework for identifying text predicted to be of interest to users according to some implementations.

This disclosure includes techniques and arrangements for identifying text in a content item that is predicted to be of interest to one or more people that may access the content item or that may be considering acquiring the content item. For example, the identified text may be an excerpt from the content item that is predicted to be profound, important or otherwise interesting based, at least in part, on a similarity to text in other content items that has been recognized as being of interest based on information received from a plurality of users. The identified excerpt of text from the content item may be presented to a user, such as during browsing of the content item on a merchant website. For example, if a user of an electronic device is shopping for a book to read, one or more excerpts from the book may be selected and presented to the user with other information related to the book. Additionally, or alternatively, one or more selected excerpts of text may be highlighted or otherwise identified to a user that accesses the content item, such as during reading, viewing or other consumption of the content item.

As one example, a text classifier may be generated based, at least in part, on popular highlights or other user data obtained from a plurality of users with respect to a large number of content items. For instance, the highlights made to each content item by a plurality of users may be aggregated to determine the portions of each content item that are highlighted most frequently, i.e., more than the other portions of the content item. Thus, the popular highlights may be identified for each content item in a large corpus of a plurality of content items. The grammatical structuring and other features of the text of the popular highlights from the plurality of content items may be used to predict a probability of other text being highlighted or annotated in a given content item. Thus, popular highlights or other text that has been identified or selected as being of interest to users, such as from a plurality of content items, may be used to train a text classification model to provide a text classifier. The text classifier may be a statistical model that is trained on a plurality of features of excerpts of text in a set of training data. The training data may include a plurality of content items in which portions of text have been identified as being interesting, such as based on annotations or other user input from a plurality of users. In some examples, the profoundness or interest in an excerpt of text may be proportional to the number of times that the excerpt is highlighted or otherwise annotated, quoted, or selected by the plurality of users.

Following training of the text classifier, the text classifier may be used to predict which portions of text of other content items are likely to be annotated or otherwise considered to be profound or of interest to users. For example, some content items may not have yet been annotated by any users, such as in the case of less popular content items or newly released content items. Thus, the trained text classifier may give a score to each sentence, each clause, each phrase, each paragraph, or other portion of text in a content item based on the features used to generate the classification model. Accordingly, the text classifier may assign a "profoundness rating" to each portion of text, and may predict which portions of the content item are likely to be highlighted or otherwise annotated or selected by users who read the content item.

As one example, a content provider may aggregate user highlights to determine which portion of each content item is popularly highlighted by a number of users. A text classifier may be trained based on this information to detect "quality" or "profoundness" in written text, such as in other content items, user reviews of content items and other products, or any other textual content. Some example applications herein include determining predicted highlights for new or unpopular books, such as by predicting which portions of text may be interesting to users before the users have highlighted or otherwise annotated the text. Thus, the trained text classifier may be used to predict which portions of the book will become popular highlights, and these portions may be presented to users that have acquired access to the content item or that are considering acquiring access to the content item. In addition, the information regarding those portions that are believed to be most interesting (or least interesting) can be provided to the author of the content item before the final publication of the content item, such as to enable editing of the content.

Other example applications herein may include applying the text classifier to other types of textual content other than electronic books (eBooks), such as to customer reviews of content items or other products, forum comments, blog posts, and so forth, to identify particularly profound or interesting insights in the textual content. As one example, highly ranked insights from customer reviews can be displayed in an alternate widget on a details page, such as for showing general feelings towards a content item or other product. Additionally, some implementations may provide a quality score to customer reviews, allowing sorting of the customer reviews by quality (such as before other reviewers rate the review as helpful or not helpful). Further, some techniques herein can be applied in reverse to determine low quality pieces of text, probable spam and the like.

For discussion purposes, some example implementations are described in the environment of predicting interesting portions of text of a content item, such as an electronic book. However, the implementations are not limited to the particular examples provided, and may be extended to predicting interesting or quality portions of other types of text, as will be apparent to those of skill in the art having the benefit of the disclosure herein.

Example Framework

FIG. 1 illustrates an example framework 100 for identifying text predicted to be of interest to users according to some implementations. Portions of the framework 100 may be executed by one or more computing devices 102, such as one or more computing devices of a content provider or any other entity that receives or obtains a body of text 104, such as a body of text of a content item 106a or, alternatively, a body of text from some other text source 108, such as user reviews, blogs, forum posts, and so forth. Accordingly, implementations herein are not limited to any particular source, use or purpose for the text 104 that is analyzed or processed according to the implementations herein. In some examples, the framework 100 may be used to automatically determine a portion of the text 104 that is predicted to be profound or interesting, such as without human intervention.

The computing device 102 may access, obtain, or otherwise receive the text 104. For example, in the case that the text 104 is from a content item 106a, the text 104 may be received from a content item library (not shown in FIG. 1), or other source of content items, such as from an author, publisher, or other computing device of the content provider. Similarly, when the text is from another the text source 108, the text 104 may be received by the computing device 102 from the other text source 108, such as from customer reviews of products, user forums, blog text, and so forth.

The computing device 102 may process the text 104 using a trained text classifier 110. For example, the text classifier 110 may have been trained in advance using training data 112 that includes a plurality of content items 106b and corresponding user-selected text portions 114. For example, the user-selected text portions 114 may include aggregated user annotations made with respect to excerpts of the content items 106b, or may otherwise identify portions of text in the content items 106b that have been selected by one or more users such as for posting, quoting, annotating or the like. As on example, the user-selected text portions 114 may identify portions of text in the content items 106b that have been highlighted by a plurality of users.

The text classifier 110 may process the text 104 by identifying features in the text 104 corresponding to features in the text portions identified in the content items 106b by the user-selected text portions 114. As indicated at 116, the results of applying the text classifier 110 to the text 104 may include scoring of text portions of the text 104. For example, the classifier 110 may assign a score to each sentence, each phrase, each paragraph, or the like, in the text 104 to indicate a probability that the sentence, phrase, etc., may be of interest to a user. As one example, the classifier 110 may rank all the sentences in the text 104 in order of assigned scores, with those predicted to be most likely to be selected or annotated by a user being ranked highest, and those predicted to be least likely to be selected or annotated being ranked lowest. The computing device 102 may select one or more highest-ranked text portions as identified text portion(s) 118 that are predicted to be of most interest to users, e.g., most likely to be annotated. For example, the top 3, top 5, top 10, etc., highest-ranked text portions 118 may be used for the various applications herein, such as for indicating to users portions that are believed to be most important, or for selecting text portions to display during marketing of the content item.

When identification of interesting text portion(s) 118 has been completed, the computing device 102 may provide the text portion(s) 118 to another computing device, to a storage device, to a storage medium, or the like. The one or more identified text portions 118 may be employed for any number of purposes, such as being included in content item metadata 120 or in webpage information 122. As one example, when the body of text 104 corresponds to a content item 106a, such as an eBook, the computing device 102 may include the identified text portion 118 in metadata 120 included with the content item 106a in a content item library, a content item cataloging service, a content item formatting service, or the like. For instance, when the content item 106a is displayed on an electronic device of a user, the identified text portion 118 may be highlighted to a user as possibly being of interest.

As another example, the selected portion 118 may be displayed in a webpage or other offer for sale or advertisement for the content item 106a. For instance, the content item 106a may be offered for acquisition on a merchant website, and one or more of the identified text portions 118 may be displayed with other information related to the content item 106a as excerpts that may interest a user in purchasing access to the content item 106a.

In still other examples, the identified text portion(s) 118 may be provided to an author 124 of the content item 106a to inform the author of those portions of the content item 106a are predicted to be of most interest to users. Thus, the author may use this information to edit the book prior to publication or when writing subsequent books. Additionally, or alternatively, the author 124 may be provided with an identification of the portions of the content item that are ranked lowest so that the author may consider whether those portions require further editing.

As still another example, the identified text portion 118 may be used to provide study guide notes 126 to users that read the content item 106a. In some cases, the ranking of the profoundness of each sentence in the content item 106a by the text classifier 110 may be cross-referenced with characters identified in the content item. As discussed below, the important characters, places, organizations, things, and topics in a content item may be identified. Thus, profound statements by a particular character may be identified using the rankings of the text portions 118 and by determining each sentence in the content item that each character is associated with. Similarly, interesting sentences related to a particular topic may be identified based on the rankings of sentences that are also cross-referenced as being associated with the particular topic identified in the content item.

As still another example, the body of text 104 may be a plurality of customer reviews, such as reviews of content items or other products. The scoring 116 of the text portions may rank the customer reviews to provide customer review rankings 128. For example, customer reviews that contain sentence structures or other features that are typically included in highly rated reviews may be more highly ranked in the scoring of the text portions 116. Accordingly, one or more identified text portions 118 may be the most highly ranked customer reviews.

In still another example, the body of text 104 may correspond to a plurality of blog posts or forum comments posted to an online discussion forum. The scoring of the text portions 116 may rank the forum comments to provide forum comment rankings 130.

In another example, the rankings or scorings of the text portions 116 may be cross-referenced with supplemental information such as named entities, topics, places, time periods, etc., identified in the content item, as indicated at 132, or in other content items as indicated at 134. For example, a user may display a content item on a display of a device, and the user may select the name of a character from the displayed text of the content item. The device may present one or more identified text portions 118 associated with the character, such as ranked according to the scoring of the text portions 116. Similarly, if the user selects a particular topic identified in the content item, the text portions corresponding to the topic may be presented in a ranked order based on the scoring of the text portions 116.

In some examples, the scoring may be extended across other books or other content items. For example, when the user selects a topic from a first content item, the device may also present highly ranked text portions related to the topic and obtained from one or more other content items, such as other content items in the user's digital library or in a digital library of a content provider. Similarly, when a content item is part of a series of content items, such as a series of books, and a character name is selected, the highly ranked text portions associated with the character from other content items in the series may be presented to the user. Techniques for identifying the supplemental information, such as characters, people, places, organizations, topics, time periods, and the like, are discussed additionally below. Numerous other applications and uses for the scoring of text portions 116 and the identified text portions 118 will be apparent to those of skill in the art in light of the disclosure herein.

Example Interfaces

Figure 2:
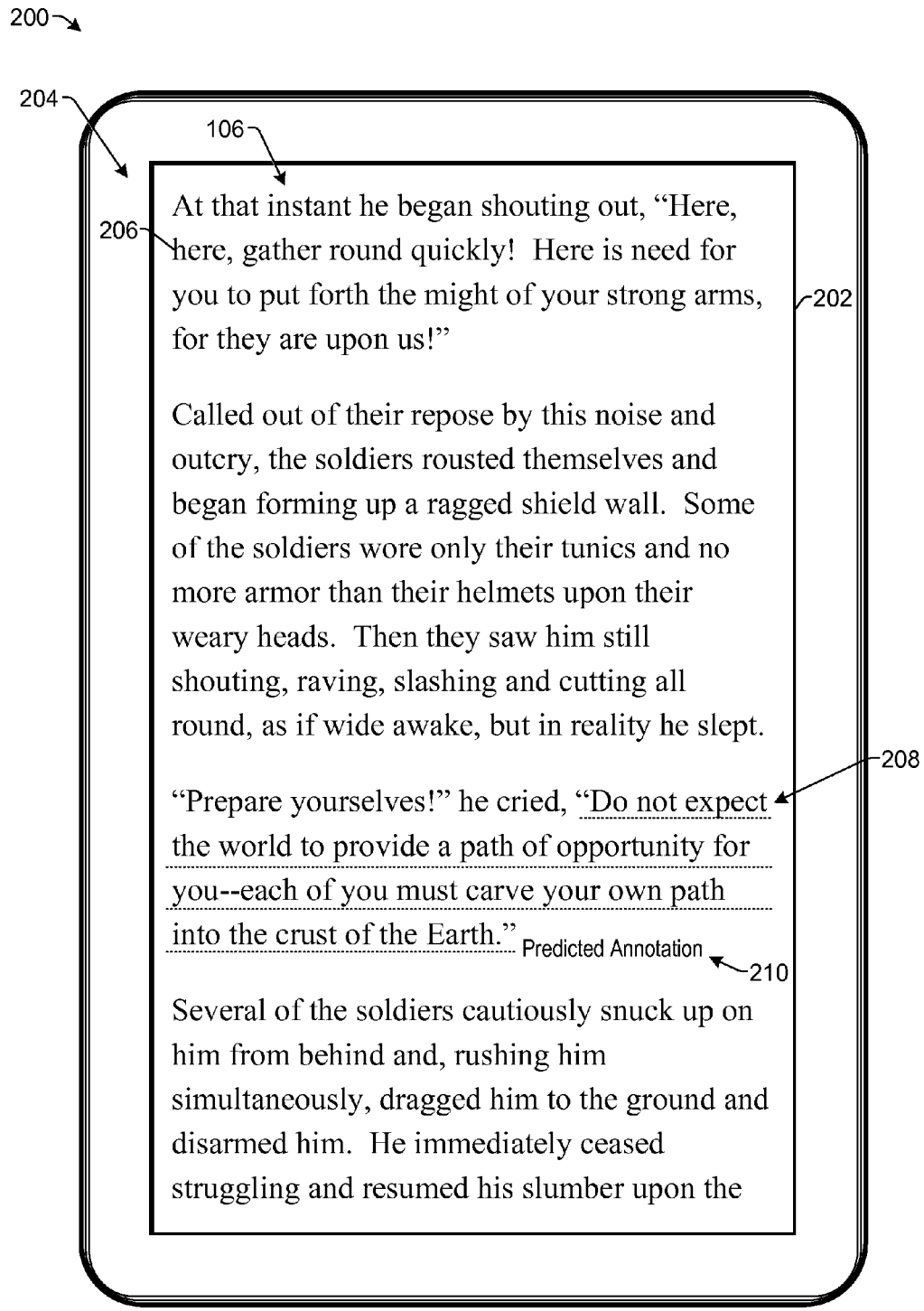
FIG. 2 illustrates an example electronic device able to display a content item that includes text predicted to be of interest to users according to some implementations.

FIG. 2 illustrates an example electronic device 200 able to present a content item including a text portion that is predicted to be of interest to a user according to some implementations. The electronic device 200 may be implemented as any of a number of different types of electronic devices, as discussed further below. The electronic device 200 may include, or may have associated therewith, a display 202 to present an interface 204 for displaying text 206 of a content item 106, which may correspond to the content item 106a in some examples.

In some types of electronic devices 200, the display 202 may be a touch-sensitive display configured with a touch sensor to sense a touch input received from an input effecter, such as a finger of a user, a stylus, or the like. Thus, the touch-sensitive display may receive one or more touch inputs, stylus inputs, selections of text, and so forth. In other implementations, the display 202 may be non-touch sensitive. Accordingly, in addition to, or as an alternative to, a touch sensitive display, the electronic device 200 may include various external controls and input devices. For example, some implementations (not shown in FIG. 2) of the electronic device 200 may include a virtual or physical keyboard, a mouse, a pointing stick, a touchpad, a trackball, a joystick, a remote control, buttons and/or various other controls for performing various desired inputs and interactions with the electronic device 200 and the content item 106 presented on the display 202. Additionally, in some implementations, one or more voice commands may be used to control or interact with the content items or interfaces herein. Further, in some examples, a user's eye position or point of focus may be detected to serve as inputs or commands. Thus, implementations herein are not limited to any type of input devices, techniques, or controls.

In some cases, the content item 106 may be an electronic book (eBook) including the text 206, such as on one or more pages. For example, the display 202 may present the text 206 of an eBook and any images, illustrations, tables, maps, or graphic elements that might be contained in the eBook. The terms "book" and/or "eBook," as used herein, may broadly include electronic or digital representations of printed works, as well as digital content that may include text, multimedia, hypertext, and/or hypermedia. Examples of content items 106 may include, but are not limited to, electronic versions of books, magazines, newspapers, periodicals, journals, reference materials, textbooks, anthologies, instruction manuals, proceedings of meetings, forms, directories, web pages, plays, screen plays, closed captioning transcripts of movies and television shows, song lyrics, personal documents, and so forth, as well as other types of content items including text that the user may view or interact with using the electronic device 200. Accordingly, a content item 106 may include any readable or viewable textual content that is in electronic or digital form.

In addition, the interface 204 may present highlights, notes, comments, or other annotations to the content item 106. In the illustrated example of FIG. 2, suppose that the content item 106 corresponds to the content item 106a for which the text has been classified using the text classifier 110. Thus, a text portion 208 of the text 206 of the content item 106 may have been identified as being predicted to be profound or otherwise of interest to a user. Accordingly, the text portion 208 may be highlighted, underlined, bolded, italicized, color coded, otherwise visually distinguished or otherwise identified to the user when the content of the content item 106 is presented on the display 202. Further, the text portion 208 may include an indicator 210 to indicate to the user that the text portion 208 is a predicted annotation.

Subsequently, suppose that a plurality of users highlight or otherwise annotate one or more portions of the particular content item 106 of FIG. 2. These highlights or other annotations may be aggregated by the content provider to identify portions of text that are popularly annotated in the content item 106. An indication of the popularly annotated portions may be provided to the electronic device 200, such as in a metadata update provided to the device 200. Thus, the interface 204 may access the metadata to present an indication of portions of the content item 106 that have been highlighted (i.e., "popular highlights") or otherwise annotated by a plurality of other users. In some examples, the popular highlights may replace the predicted annotation text portion 208. In other examples, the popular highlights and the predicted annotation text portion 208 may both be displayed with the content item 106. Additionally, the user of the electronic device 200 may make his or her own annotations to the text 206 of the content item 106. These annotations (not shown in FIG. 2) may be displayed to the user with the content of the content item 106, and may be included with the annotations aggregated by the content provider for the content item 106 when determining the popular annotations for the particular content item 106.

Figure 3:
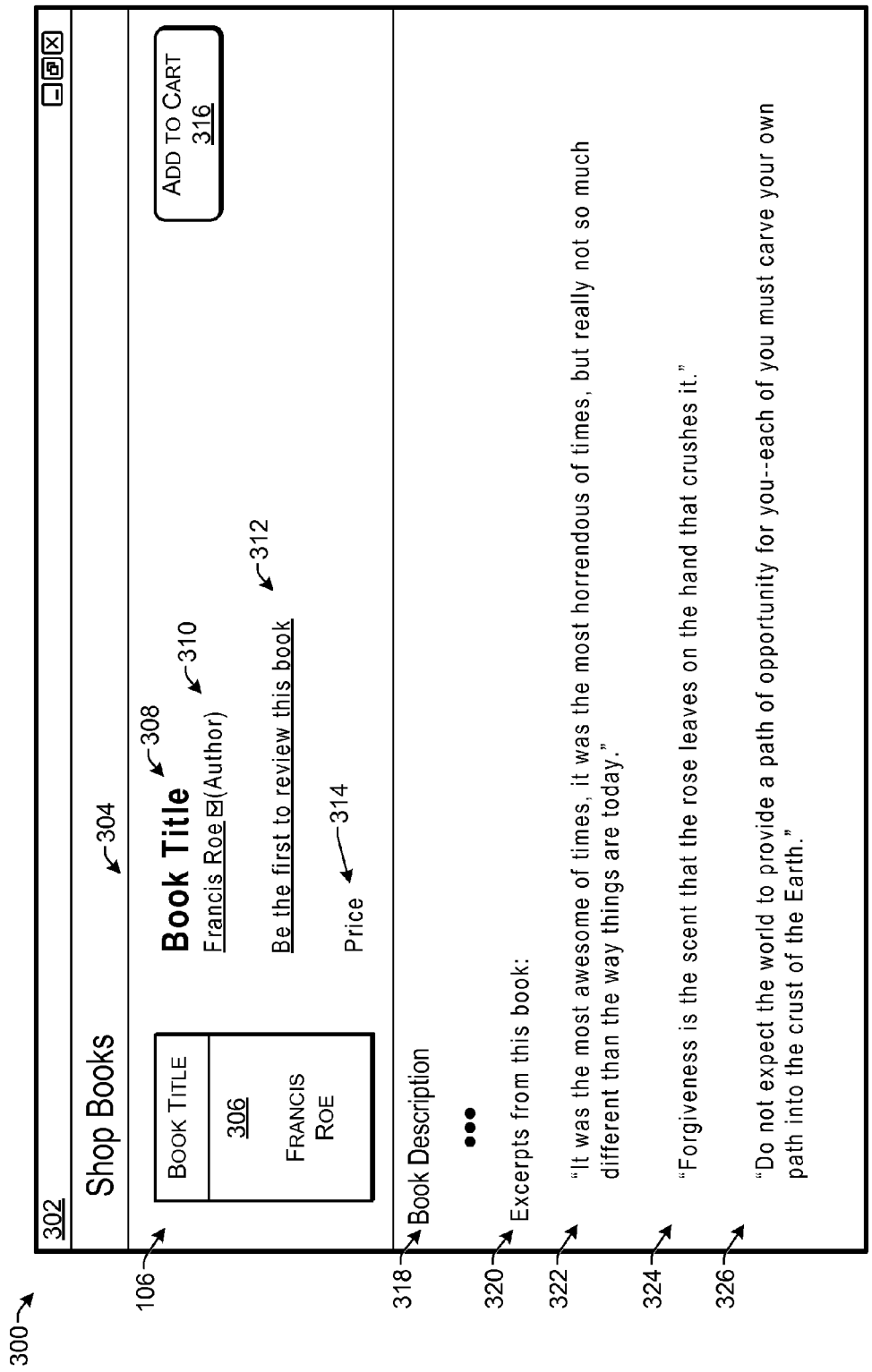
FIG. 3 illustrates an example user interface that may be presented to a user, such as during shopping for a content item, according to some implementations.

FIG. 3 illustrates an example user interface 300 that may be presented to a user, such as during shopping for a content item, browsing through content items, or the like, according to some implementations. The user interface 300 may include a window 302 accessed by the user, such as may be provided by a content provider site, or the like. The user interface 300 may be accessed by the user through a web browser, an application, a device, a kiosk and so forth. The window 302 may contain an offer 304 of a content item 106, which in this example is a book, and which may correspond to the content item 106a discussed with respect to FIG. 1. In this example, the offer 304 includes an image 306 of a cover of the content item 106, a book title 308 of the content item, the name 310 of the author of the content item, and an invitation/link 312 to enable the user to provide a user review of the content item 106. The offer 304 may further include a price 314 for the content item 106, and a selectable button or control 316, which may be selected by the user to purchase or otherwise acquire access to the content item 106. For example, the user may purchase a physical copy of the content item 106, i.e., a print book. Additionally, or alternatively, the user may purchase a digital version of the content item 106, which may be downloaded or otherwise made available for access by an electronic device of the user, such as according to a license agreement or the like.

The interface 300 may further include a book description 318 that may include a synopsis (not shown) or the like. The book description 318 may further include excerpts 320 from the content item 106. For example, the excerpts 320 may be identified using the framework 100 discussed above with respect to FIG. 1, which uses the text classifier 110 or other comparison technique to identify one or more text portions that are predicted to be of interest to a user. In this example, three excerpts 322, 324 and 326 are displayed in the window 302 for the particular content item 106. For instance, the excerpts 322-326 may have been the three highest-ranked text portions ranked by the text classifier 110. In addition, in some examples, the selection of the excerpts 320 to be displayed in the description 318 may take into consideration other factors such as a length of each of the excerpts or the like.

As one example, suppose that the content item 106 displayed in the window 302 is a newly released content item that has not yet been annotated by any users. Thus, the excerpts 320 that are predicted to be of interest to users may be provided in the book description 318 to attempt to arouse interest in potential customers to purchase the content item 106. Subsequently, a plurality of users may annotate one or more portions of the content item 106 so that the content provider may be able to determine popular annotations for this particular content item 106. If the popular annotations made by the plurality of users do not correspond to the excerpts 320 selected by the text classifier 110, the description 318 may be subsequently updated to replace the excerpts 320 with the popular annotations selected by the plurality of users. Furthermore, in the case that the popular annotations selected by the plurality of users do not match the excerpts 320, this information may be provided as feedback to the text classifier 110 to further refine the features and training algorithm of the text classifier 110.

Example Architecture

Figure 4:
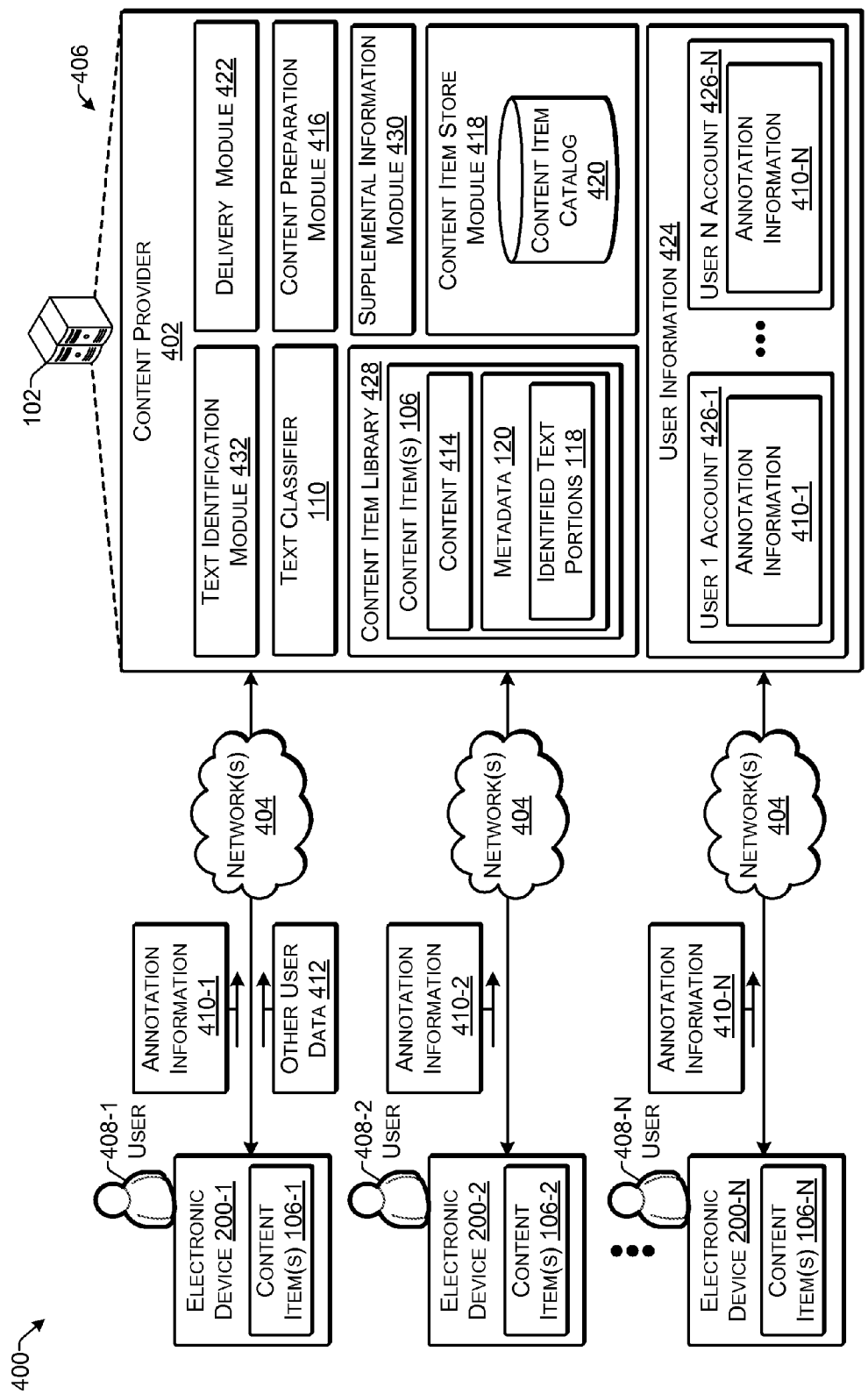
FIG. 4 illustrates an example architecture of a system for identifying text predicted to be of interest to users according to some implementations.

FIG. 4 illustrates an example architecture of a system 400 to provide content items to users and to predict text of interest to users according to some implementations. In some examples, content items 106 may be presented by one or more electronic devices 200 capable of displaying, rendering or otherwise presenting the content items 106. Some examples of the electronic devices 200 may include media player devices and eBook readers; tablet computing devices; desktop, terminal and workstation computing devices; smart phones and mobile communication devices; laptop and netbook computing devices; televisions, gaming systems, augmented reality devices, and home and automotive electronic devices; and any other device capable of accessing and rendering or displaying content items, online content, mobile content, web content, multimedia content, or the like.

In the illustrated example, a plurality of electronic devices 200, such as electronic devices 200-1, 200-2, . . . 200-N, are able to communicate with a content provider 402. For instance, each electronic device 200 may communicate with one or more computing devices 102 of the content provider 402, to access or receive information related to content items 106 over one or more networks 404. For example, the network(s) 404 may include a local area network (LAN), a wide area network (WAN), such as the Internet, or any combination thereof, and may include both wired and wireless communication technologies using any suitable protocols and communication techniques. The computing device 102 of the content provider and the electronic device 200 may communicate and interact with one another using any combination of suitable communication and networking protocols, such as Internet protocol (IP), transmission control protocol (TCP), hypertext transfer protocol (HTTP), and so forth. Additionally, in some cases, the electronic device 200 may download one or more content items 106 from the content provider 402, stream one or more content items 106, or the like.

In some examples, the content provider 402 may maintain an online location or site 406, such as a merchant website, an e-commerce site, or other functionality that may offer one or more content items 106 to the public. For example, the content provider site 406 may be hosted on one or more of the computing devices 102. In some cases, the computing devices 102 may be one or more web servers located at a data center, server farm, or other single physical location. In other cases, the content provider site 406 or portions thereof may be located in diverse locations that are physically remote from one another. Further, in some implementations, the content provider site 406 may be a group of websites, data stores, services, and the like, hosted on a plurality of different computing devices 102 in a plurality of diverse locations, or hosted by one or more computing devices 102 at a single location.

The content provider site 406 may offer content items 106 to the public through an online presence accessible by a web browser or other application on the electronic device 200. The content provider site 406 alternatively, or additionally, may offer content items 106 through an online or mobile application executing on the electronic device 200. For example, an application on the electronic device 200 may connect to or obtain information from the content provider site 406, such as the interface 300 described above, to enable a user 408 of an electronic device 200 to select, purchase or manage one or more content items 106. In some cases, the content provider site 406 may enable the user 408 of the electronic device 200 to access or acquire content items 106 through an online or mobile application executing on a mobile electronic device 200. Accordingly, the content provider site 406 is not limited to a website accessed by a browser, but may encompass other technologies for marketing content items 106, such as through in-application shopping, mobile applications, and the like.

In the example of FIG. 4, a plurality of users 408-1, 408-2, . . . 408-N may use the electronic devices 200-1, 200-2, . . . 200-N, respectively, to access one or more content items 106-1, 106-2, . . . 106-N on the electronic devices 200. For example, each user 408 may use at least one device 200 to access at least one content item 106. In some cases, each user may use multiple different devices 200 to access multiple different content items 106. For instance, users 408 typically may use a number of different types of devices 200, such as desktop computers, laptops, tablets, eBook readers, etc., to purchase and access content items 106. Thus, a single user 408 may use a plurality of electronic devices 200 to read or otherwise access a plurality of content items 106.

Each user 408 may access or receive content items 106 from the content provider site 406, such as by downloading or streaming through the network 404. Further, in some implementations, one or more of the users 408 may make annotations to one or more of their content items 106. For example, annotations may include highlighting a selected portion of text, writing notes in association with a selected portion of text, providing a comment on a portion of text, bookmarking a portion of text, and the like. Annotation information 410-1, 410-2, . . . , 410-N may be sent to the content provider 402 from the respective electronic devices 200. For example, to synchronize the annotations made to a content item 106 maintained on a first electronic device of the user to another instance of the content item 106 on a second electronic device of the user, the annotations made by a user are sent to the content provider 402 as annotation information 410.

Additionally, in some cases, other user data 412 with respect to a content item 106 may also be sent to the content provider 402. For example, a user 408 may wish to post a quote or excerpt from a content item 106 to a social network, such as Facebook®, or to a microblog, such as Twitter®. This information may be sent to the content provider 402, which may forward the post to the desired target destination. Additional examples of the other user data 412 that may useful for training the text classifier herein may include customer reviews that include excerpts, posts to discussion forums maintained by the content provider 402, posts to fan websites or book enthusiast sites, such as Shelfari®, and so forth.

In some examples, each content item 106 provided by the content provider 402 may include content 414 and associated metadata 120 that is associated with the particular content item 106, such as in one or more metadata files. In some examples, the metadata 120 may include the identified text portions 118 identified from the content item 106 using the text classifier 110, as discussed above with respect to FIG. 1. In some examples, the metadata 120 may be contained in a separate file from the content 414, while in other examples the metadata 120 may be combined with the content 414 into a single file.

In some implementations, each content item 106 may include the content 414, such as text, images or the like, and may further include the metadata 120 that is associated with the content 414. For example, the content provider 402, the author, the publisher, etc., may provide or may generate at least a portion of the metadata 120 for a corresponding content item 106. In some cases, the author or publisher may identify a genre or category for a content item, while in other cases, the content provider may perform this function. In some examples, the content provider 402 may generate the metadata 120 for a respective content item 106 to provide information related to the content 414 of the content item 106. For instance, the content provider 402 may include a content preparation module 416 that may receive a raw content item from one or more sources of content items, such as publishers, authors, artists, and so forth. The content preparation module 416 may parse and process the text of the raw content item to produce the content 414 that is compatible with various display formats, device platforms, and so forth. The content preparation module 416 may further parse and analyze a raw content item to produce at least a portion of the metadata 120 that corresponds to the content item 106.

The content provider site 406 may include a content item store module 418 that may provide or may access a content item catalog 420. For example, the content item store module 418 may present the content item catalog 420 to an electronic device 200 that accesses the content provider site 406 such as during shopping for a content item 106. The content item catalog 420 may include searchable and/or browsable listings and descriptions of content items 106 available from the content provider site 406, such as may be presented in the interface 300 discussed above. The content item store module 418 may communicate with the electronic device 200 to enable the user 408 to locate and acquire a content item 106 from the content provider site 406. In some examples, the content item store module 418 may provide one or more of the interfaces 300 related to content items to an electronic device 200 that accesses the content item store.

The content provider site 406 may further include a delivery module 422 that may deliver (or make available for delivery) a content item 106 to the electronic device 200 and/or the user 408. For example, in some instances, the delivery module 422 may facilitate the download of a content item 106 to the electronic device 200 over the network(s) 404 following a purchase of access to the content item 106. In other instances, the delivery module 422 may provide for delivery of a hard copy of a content item 106 to the user 408, such as by delivery of a storage medium that maintains a copy of the content item, or a printed version of the content item 106, depending on the nature of the content item and the electronic device 200. The delivery module 422 may also expose programmatic interfaces or APIs (application programming interfaces) that electronic devices 200 can use to obtain content items 106 and related services.

Furthermore, in some implementations, the content provider 402 may maintain user information 424. For example, the user information 424 may include one or more user accounts 426, which may include user data, such as user contact information, a purchase history, a user content item library, information on various devices 200 associated with a particular user account 426, or other records relating to content items purchased by the user 408, as well as records of other transactions of the user 408 with the content provider 402.

The user accounts 426 may further include the annotation information 410 received from the users 408, such as annotation information 410-1 associated with first user account 426-1, . . . , annotation information 410-N associated with the Nth user account 426-N. The annotation information 410 associated with a particular user account 426 may be used to synchronize each content item 106 with other instances of a particular content item on other devices 200 associated with the particular user's account 426. Accordingly, the delivery module 422 of the content provider 402 may send synchronizing information to the other device(s) of the particular user. The synchronizing information may include the annotation information 410 and position information, such as a last position accessed in the content item, so that when the user accesses the content item 106 on the other device, the other device may present the content item in the same position as when the user last accessed it on the first user device and with any annotations added by the user.

The content provider site 406 may also include or may access a content item library 428. For example, the content item library 428 may include a plurality of content items 106 that the content provider 402 has available for access by electronic devices 200, such as by purchase through the content item catalog 420. Each content item 106 in the content item library 428 may include both content 414 and metadata 120 corresponding to the content. In some examples, the content item library 428 may contain hundreds of thousands of unique content items 106, including a variety of eBooks, such as fiction, non-fiction, etc., and various other genres and types of content items, examples of which have been enumerated herein.

The content provider site 406 may further include a supplemental information module 430 that may be employed in some implementations for generating and managing supplemental information that may be used to identify significant characters, places, topics or other terms in the content item. The supplemental information module 430 may operate on the content items 106 in the content item library 428 to produce supplemental information for each content item 106 that may be stored with the metadata 120 for that content item. For example, the supplemental information module 430 may select a particular content item 106 from the content item library 428, and may parse and index the content item 106 by identifying characters, people, things, phrases, places, topics, organizations, themes, and so forth, which are of significance in the content item. In some examples, the supplemental information module 430 may access various authoritative sources of information, as well as performing statistical analysis and modeling to identify the significant characters, terms, etc., in the particular content item 106. Thus, the supplemental information module 430 may identify proper names, place names, statistically improbable phrases, and the like, in the text of the content item. For instance, a statistically improbable phrase is a word or combination of words that occur in the text of a content item one or more times in a manner that is outside of a predetermined threshold. If a particular phrase is used multiple times in a content item, while not being used, or being used rarely, in other content items in a corpus of content items, this may be a statistically improbable phrase that is a candidate to become a term of interest to the content item.

To determine which candidate names or terms may be of importance to the content item, the supplemental information module 430 may access external sources of information outside the content item. For example, the supplemental information module 430 may access network accessible resources that may include online sources of information, such as Wikipedia®, Shelfari® and IMDb®, online dictionaries, online encyclopedias, wikis, online reference sites, discussion forums, or other online resources, to determine identification of characters and other significant phrases, things, events, or places in a content item 106. Further, the supplemental information module 430 may obtain additional information on the statistically improbable phrases in the particular content item 106, such as by obtaining definitions or other information for these phrases from various locations, such as the authoritative sources mentioned above.

Furthermore, in some examples, the supplemental information module 430 may utilize or may access crowd-sourced information for further identifying characters and interesting terms of a content item 106. For example, websites such as Shelfari® may allow users to add crowd-sourced information related to characters, places, topics, etc., in a content item. Further, crowd-sourced information may also include information received from users 408 of electronic devices 200 to correct errors in characters and terms identified in a content item 106. Users 408 may also assist in identifying alternate names for characters, identifying topics, identifying text related to themes, relationships, events, and interactions, and so forth. Additional details of generating the supplemental information for a content item are described below with respect to FIG. 6.

Additionally, the content provider 402 may include a text identification module 432 that may train, manage and utilize the text classifier 110 for identifying one or more text portions 118 of a content item 106 that are predicted to be of interest to users. For example, the text identification module 432 may receive text from a content item or other text source, may apply the text classifier 110 to the text to receive a scoring of the text portions. The text identification module 432 may then select one or more identified text portions 118, such as one or more highest-ranked text portions 118 for use in the various applications described herein. Furthermore, the text identification module 432 may perform training of the text classifier 110 using the training data 112 discussed above. The text identification module 432 may also refine or further train the text classifier based on feedback information. For example, after one or more identified text portions 118 have been identified for a particular content item, subsequently, if the portions of text annotated by a plurality of users do not correspond to the identified text portions 118, the weighting of certain features or other aspects of the classifier 110 may be adjusted based on the actual differences.

Example Framework for Training the Classifier

Figure 5:
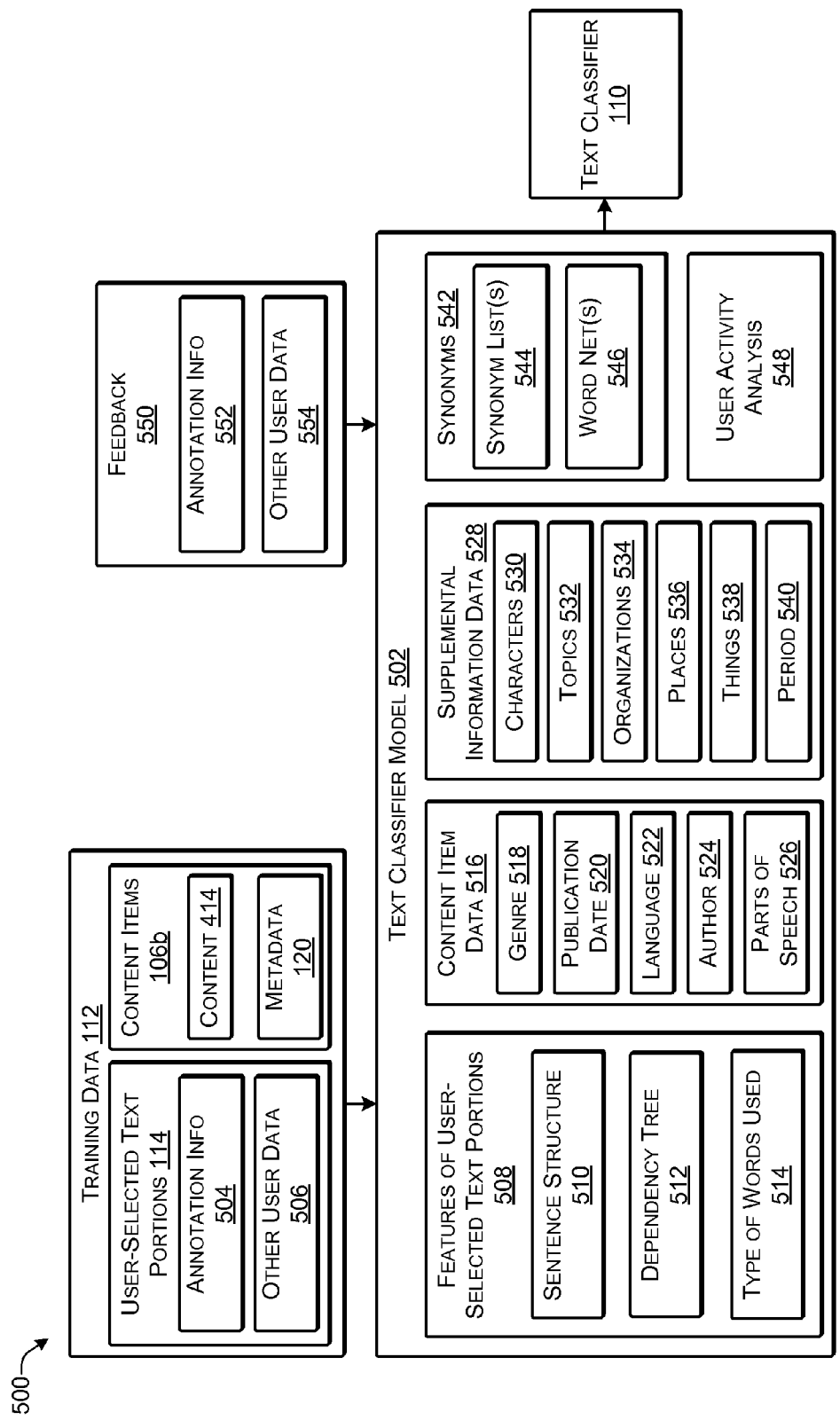
FIG. 5 illustrates an example framework for training a text classifier according to some implementations.

FIG. 5 illustrates an example framework 500 for training a text classifier model according to some implementations. The training data 112 may be used, at least in part, to train a text classifier model 502 to provide the text classifier 110. The training data 112 may include user-selected text portions 114 and multiple different content items 106*b* that correspond to the user-selected text portions 114. For example, the user-selected text portions 114 may include annotation information 504 that is aggregated from a plurality of annotations made by a plurality of users to each of the content items 106*b*. Thus, for each content item 106*b* used in the training data 112, the annotation information 504 may include popular annotations that identify portions of text of the content item 106*b* that have been annotated most often by users that accessed the content item 106*b*. Additionally, in some cases, some users may highlight only a portion of a sentence from a content item, while other users may highlight the entire sentence. Thus, the annotations of multiple users may be normalized during aggregation, such as that a highlight or annotation to a part of sentence may be counted as being applied to the entire sentence. Furthermore, the training data 112 may include other user data 506 that may be an aggregation of text portions of the particular content item 106b that users have selected, cited, quoted, or referred to in situations other than annotations, such as by posting an excerpt to a social website, a microblog site, a forum, a blog, or the like.

The text classifier model 502 may determine particular features 508 of the user-selected text portions that have been identified by the annotation information 504 and/or the other user data 506. Similarity between the features user-selected text portions and the text to which the classifier is applied may be used for ranking text portions, i.e., the more similar the features, the higher the rank. As one example, the text classifier model 502 may determine the sentence structure 510 of each user-selected portion of the content item to determine characteristics of the sentence structure such as subject, direct object, adjective and adverb use, and the like. The model 502 may construct a dependency tree 512 that identifies the dependencies of the various parts of speech in the user-selected text portions 114. Furthermore, the model 502 may identify the words used or types of words used 514 in the user-selected text portions. For instance, if a portion of text uses a number of the same words or same types of words (e.g., based on synonyms) as a user-selected text portion, then there is an increased likelihood that the portion of text may also be selected by a user. In addition, the model 502 may refer to content item data 516 for the particular content item 106b, such as for determining a genre 518 of the content item, a publication date 520 of the content item, a language 522 of the content item, and an author 524 of the content item.

For instance, the genre 518 of a content item may be taken into consideration when applying the text classifier 110 to another content item. For example, the type of text highlighted by a user in a romance novel may be considerably different from the type of text highlighted by a user in a comedic biography. Thus, in some implementations, one or more of the user-selected text portions 114 may belong to the same genre as a content item to which the classifier is being applied. In some examples, the classifier 110 may include a plurality of sub-classifiers, each trained on user-selected text portions 114 and content items 106b from one or more particular categories or genres 518. Examples of different categories or genres 518 of content items may include arts and photography, biographies, business, children's books, comics & graphic novels, computers & technology, cooking & food, education & reference, fiction & literature, health & fitness, history, humor & entertainment, mystery, politics, religion & inspirational, romance, science fiction & fantasy, self-help, sports, teen, textbooks, thriller & suspense, and travel.

Similarities in language, authorship, and publication date may also be taken into consideration when applying the text classifier 110 to a particular content item. The content item data 516 may also identify parts of speech 526 of the content item 106b. For instance, as discussed additionally below, each part of speech included in the content item may be identified by type and location within the text of the content item 106b. The parts of speech information 526 may be used to identify beginning locations and ending locations of sentences, paragraphs, chapters, and the like, as well as for determining sentence structure 510, the dependency tree 512, and the types of words used 514.

In addition, the model 502 may refer to supplemental information data 528 that may identify various entities or terms of interest in each content item 106. For example, the supplemental information data 528 may include characters 530, topics 532, organizations 534, places 536, things 538, and a time period 540 of the content item. Thus, the model 502 may take into consideration that quotes made by main characters of a book are typically highlighted more often than quotes made by minor characters. Similarly, portions of text that are related to a major topic in the book may be more likely to be highlighted than a portion of text that is not related to a topic. Further, the time period 540 of a setting or a place 536 of a book may have a bearing on the type of words used, the sentence structure used, and the like. Accordingly, the classifier model 502 may use the supplemental information data 528 to provide additional weighting factors for determining an importance of a piece of text.

In addition, the text classifier model 502 may consider synonyms 542 of particular words identified in the features 508 of the user-selected text portions, such as when determining whether there is a match between the types of words used 514. For example, the synonyms 542 may be a compilation of synonyms that includes one or more synonym lists 544 and/or one or more word nets 546. The synonym list(s) 544 may be used when considering the overall meaning of types of words used 514 in the user-selected text portions such as by providing clusters of words having similar meanings based on a particular word used in a user-selected text portion 114. Furthermore, a word net 546 may be a weighted graph that indicates how closely related certain words are to one another. Thus, the word net 546 may be used to compare types of words used in the user-selected portions 114 with words used in a content item 106 to which the text classifier 110 is applied.

Additionally, the text classifier model 502 may also include user activity analysis 548. For example, not all of the user comments or annotations on a user-selected portion of text may be for positive reasons. For instance, in some cases the user may highlight a portion of text or comment on a portion of text because the user thinks the text is poorly written, difficult to understand, or the user may share the portion of text as a joke or with a comment as to how bad the text is, etc. Accordingly, the text classifier model 502 may analyze comments, notes, or other content in comments made by one or more users, to determine whether there is an indication of a negative reason that the portion of text was selected by the user. Further, in the case that the text portion is posted to a social network or microblog, the reaction of other users may also be taken into consideration, where permitted. Portions of text selected by a user for which a negative connotation or negative content has been detected may not be included in the training data 112 used to train the text classifier 110 for predicting interesting portions of text. However, such text portions may be used to train a different classifier, such as for identifying text that is not profound or that is not likely to be selected by a user.

The text classifier 110 and classifier model 502 may be any suitable type of classifier, such as a decision tree classifier, a logistic regression classifier, a support vector machine, a quadratic classifier, a linear classifier, a kernel estimation classifier, a neural network, a Bayesian network, a hidden Markov model, or the like. Accordingly, this disclosure is not limited to any particular type of classifier model. For example, the classifier model 502 may be any combination of algorithms, learning models, statistical models, feature vectors, and so forth, that receive a body of text as an inputs, and categorize, group, cluster, ranks, or otherwise classifies a plurality of portions of the input text into one or more sets, groups, rankings, or the like, such as based on one or more quantifiable properties or features such as sentence structure, word types used, associations of text portions with entities or terms identified in the text, and so forth.

In some examples, feedback 550 may be applied to further refine or train the model 502. For example, the feedback may include annotation information 552 and other user data 554 that is gathered for a particular content item 106 following prediction of the interesting portions of the particular content item 106. For example, if the text portions actually selected by users are not as highly ranked as some of the text portions identified by the text classifier 110, weightings applied to various features of the text classifier 110 may be adjusted to bring the predicted text portions more into line with the actual text portions selected. Numerous other variations will be apparent to those of skill in the art having the benefit of the disclosure here and.

Example Framework for Identifying Terms

Figure 6:
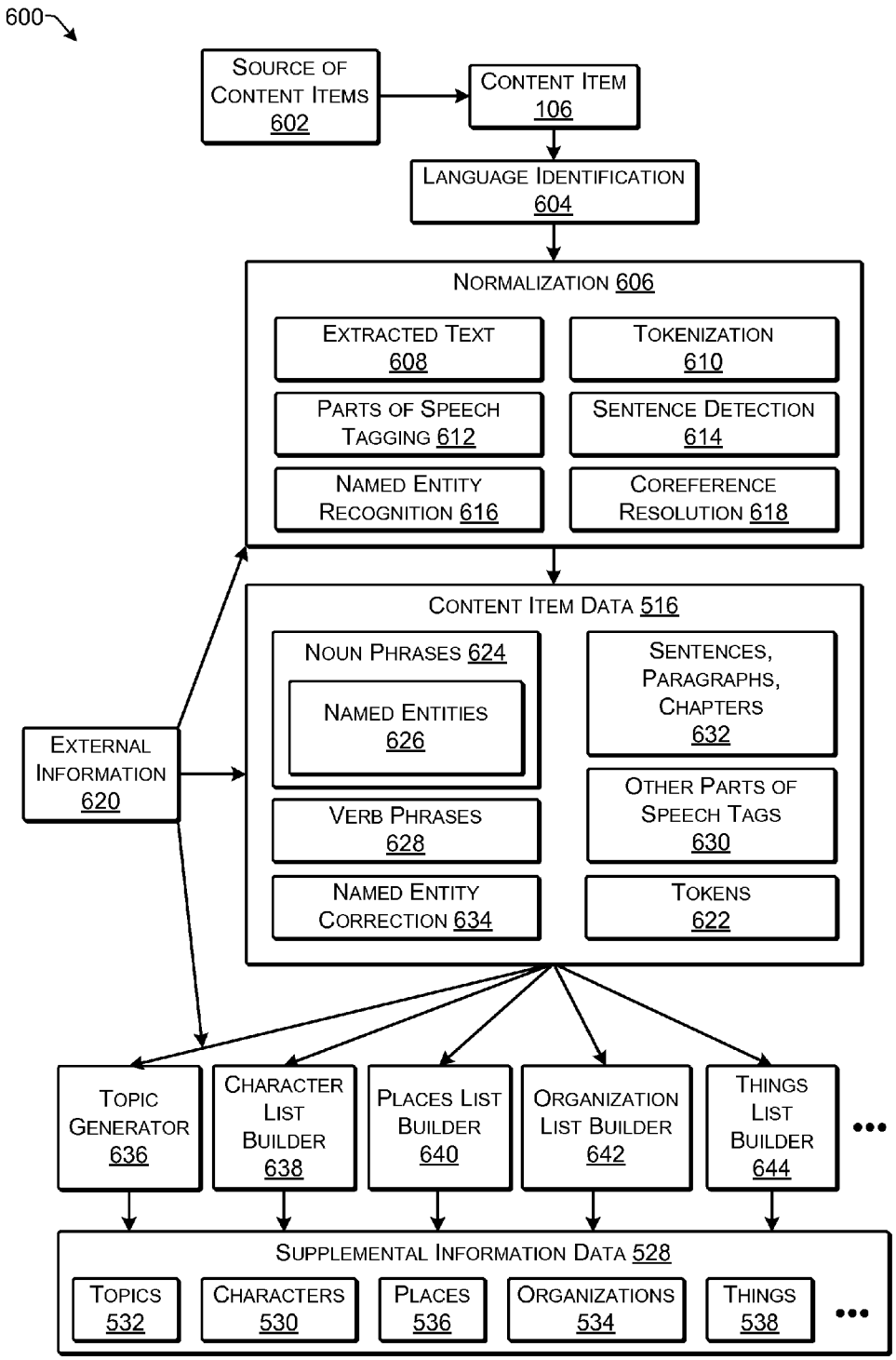
FIG. 6 illustrates an example framework for determining content item data and supplemental information data according to some implementations.

FIG. 6 illustrates an example framework 600 that may be employed by the supplemental information module 430 of the content provider 402 for generating supplemental information data 528 according to some implementations. The supplemental information may include one or more significant entities or terms identified in the content item 106, such as significant character names, topics, organizations, places, things and the like. In this example, the content provider 402 may receive a content item 106 from a source 602 of content items, such as from a publisher, an author, the content item library 428, or other source of content items. The content item 106 may undergo language identification, as indicated at 604, to identify the language in which the text associated with the content item 106 is written. Further, since content items may be stored in a variety of different formats, the text of the content item 106 may be normalized, as indicated at 606, by extracting the raw text from the content item 106 to obtain extracted text 608. The normalization 606 may include tokenization 610 of the extracted text 608 of the content item 106. Tokenization 610 may include parsing the text of the content item into tokens that may include individual words, punctuation marks, symbols, etc., contained in the text of the content item 106, and associating location information with each token identified in the content item 106. Thus, each word or punctuation mark in the text of the content item 106 may be assigned a unique location sequence or location value, such as based on an offset of the token from the beginning of the content item and a number of characters in the token, which may be referred to as the length of the token.

Furthermore, normalization 606 may include, or may be followed by, parts of speech tagging 612 and sentence detection 614. Parts of speech tagging 612 may include identification of parts of speech in the text of the content item 106, such as noun phrases, verb phrases, and various other parts of speech that may be of interest for identifying the categories of the content item discussed above. Thus, each token may be associated with at least one part of speech. In addition, sentence detection 614 may include identifying sentences, paragraphs, and chapters contained in the content item 106.

Additionally, normalization 606 may include, or may be followed by, named entity recognition 616 and coreference resolution 618. For example, named entity recognition 616 may include recognizing entities in the content item, such as names of people, places, organizations, topics, certain numerical expressions, quantities, and so forth. For instance, proper nouns, such as names of people, places, organizations, and the like, may be identified based on various lists of names, or other techniques for detecting and distinguishing these separate types of entities. Furthermore, in some cases, external information 620, that is external to the content item 106, may be employed to assist in named entity recognition, such as by referring to the network accessible resources and/or crowd-sourced information, as discussed above with respect to FIG. 4, or other suitable resources such as files or databases of names, nicknames, places, organizations, etc. In addition, coreference resolution 618 may involve identifying occurrences in the content item 106 in which multiple different expressions or pronouns refer to the same thing in the content item 106.

The normalization 606, including the operations described above, results in the content item data 516 discussed above. The content item data 516 may include tokens 622 that may be assigned location information. The content item data 516 may further include noun phrases 624, which may include for example, proper nouns for some named entities 626, such as people/characters, places, organizations, as well as other nouns and noun phrases identified in the content item 106 for topics and the like. The content item data 516 may further include verb phrases 628 and other parts of speech tags 630 identified in the content item 106. The content item data 516 may further include information on sentences, paragraphs and chapters 632 identified in the content item 106.

Additionally, in some instances, named entity correction 634 may be performed for named entities 626 identified in the content item data 516. As one example, an employee of the content provider 402 may check the named entities 626 in the content item 106 for accuracy. As another example, external information 620 may be applied for checking the named entities 626 in the content item data 516. For example, the named entities 626 for the content item 106 may be posted to a source of crowd-sourced information, which may be relied on for correcting any errors in the named entities 626 for the content item 106. Thus, the named entities 626 may be posted to a community website, such as Shelfari®, that includes a page or entry for the content item 106, and visitors to the community website may provide information to correct any errors in the named entities 626, selected categories, or the like. As another example, users of electronic devices 200 who receive the supplemental information data 528 with a content item may note an error in the supplemental information and may provide the external information 620 used for named entity correction 634. Accordingly, crowd-sourced information and crowd-sourced corrections may be used in some cases to perform named entity correction 634.

The content item data 516 may be used to generate supplemental information data 528, which may include entities and terms identified in the content item 106. For example, a topic generator 636 may employ external information 620 to generate one or more topics from the content item 106. For example, the topic generator 636 may generate a set of useful topics based on a detection of what the content item 106 is generally related to and, by extension, where to find more information about the identified topics, such as in the current content item or other content items. For example, the topic generator 636 may access Wikipedia® or other network accessible resources to determine which of the noun phrases 624 or other terms identified in the content item 106 correspond to entries in Wikipedia® or other network accessible resources. Some examples assign ranks to candidate topics based in part on an analysis of links to the entry associated with each candidate topic. Any of various link analysis ranking techniques may be applied, such as the PageRank® algorithm, or other suitable link analysis algorithms and techniques for assigning a link-based rank to each topic. Thus, the links to a particular entry corresponding to a particular topic from other entries corresponding to other topics may be considered during ranking of the candidate topics.

Additionally, the contribution of a particular candidate topic to other candidate topics in the content item 106 may also be considered. This may be determined by calculating a contribution based on an analysis of links from an entry of a candidate topic to the other entries corresponding to the other candidate topics. A link analysis algorithm may also be adapted for making this determination. Thus, the candidate topics may be ranked based on the values of incoming and outgoing links of corresponding entries in the network resources, and those candidate topics having a rank below a certain ranking threshold may be pruned or otherwise removed from consideration. Further, other techniques may also be used to rank the connectedness of candidate topics. As one example, the ranking of the candidate topics may be based merely on the number of incoming and outgoing links for each candidate topic entry. Other variations will also be apparent to those of skill in the art in view of the disclosure herein.

In addition, in some examples, a term frequency-inverse document frequency (tf-idf) value may be calculated for each candidate topic to further refine the number candidate topics for a content item. For example, a very large corpus of textual works (e.g., thousands or hundreds of thousands of textual works) may be parsed into n-grams, e.g., one-word n-grams, two-word n-grams, three-word n-grams, four-word n-grams, and five-word n-grams. The frequency of occurrence of each n-gram in the corpus may be determined and normalized based on inverse document frequency. The frequency of the candidate phrases in the instant content item may then be compared with the frequency of those candidate phrases in the works of the overall corpus using tf-idf values. Candidate phrases having a tf-idf value that differs from the tf-idf value for that phrase in the corpus by less than a certain tf-idf threshold may be removed from consideration since they are likely common phrases that do not bear much importance to the subject of the content item 106. The candidate topics that remain may be designated as the set of "topics" 532 for the instant content item 106. Thus, the topics 532 so identified may be included in the supplemental information data 528 for the content item 106.

In addition, a character list builder 638 may build a list of characters from the named entities 626 in the content item 106 that are identified as corresponding to people or characters. For example, the names corresponding to people in the content item 106 may be identified, such as through lists of common names, presence of titles and suffixes, lists of nicknames, and so forth. The person names in the list may be further sorted according to the fullness of name, i.e., whether both first name and last name is provided, whether just a first name or just a surname is provided, whether a prefix or suffix is provided, etc.

The names may subsequently be clustered into name sets, and the names in the name sets may further be disambiguated. For example, characters are often referred to by multiple different names in a content item. As one example, the expressions "the tin man," the "Tin Woodman," "the Woodman," and "Nick Chopper" are all used to refer the Tin Woodman character in L. Frank Baum's series of Oz books. Accordingly, the character list builder 638 associates these various different expressions or alternate names with a single character. In some instances, external information 620 may be employed by the character list builder 638, such as by referring to the network accessible resources and/or crowd-sourced information discussed above, or other suitable resources, such as files or databases of names, nicknames, places, organizations, etc.

The character list builder 638 may use the clustered and disambiguated names to create characters for the content item including the locations of each occurrence of each character name in the content item. The character list builder 638 may further determine which name to use as the representative or primary name for a particular character, such as based on a fullness or amount of information in the name. Accordingly, the character names 530 identified in the content item may also be included in the supplemental information data 528 for the content item 106.

A places list builder 640, an organizations list builder 642, a things list builder 644, and various other category builders may be employed to identify additional respective terms in the content item. For example, the places list builder 640 may identify and cluster places that are the same, but that are referred to by different or alternate names, such as by clustering "the English Channel" with "the Channel," in a manner similar to that described above with respect to the character list builder 638. The organizations list builder 634 may use similar techniques to identify organizations, such as corporations, groups, teams, institutions, associations, clubs, societies, and so forth, discussed in the content item. Further, the things list builder 644 may identify things that are believed to be important to the particular content item. For example, such things of significance for a particular content item may be identified for fiction works in a manner similar to topics identified for non-fiction works, as well as, or alternatively, from crowd-sourced information. Other term builders may be included for various other types of term categories such as themes, scenes, events, interesting or popular phrases, citations, relationships between characters, interactions between characters, time periods, and so forth. Accordingly, the supplemental information data 528 may include terms and entities that have been identified by the topic generator 636, character list builder 638, places list builder 640, organization list builder 642, things list builder 644, and so forth. Additional examples of structures, techniques and user interfaces for generating and providing supplemental information data 528 are described in U.S. patent application Ser. No. 13/433,028, filed Mar. 28, 2012, and Ser. No. 13/431,838, filed Mar. 27, 2012, the entire disclosures of which are incorporated herein by reference.

Example Computing Device(s)

Figure 7:
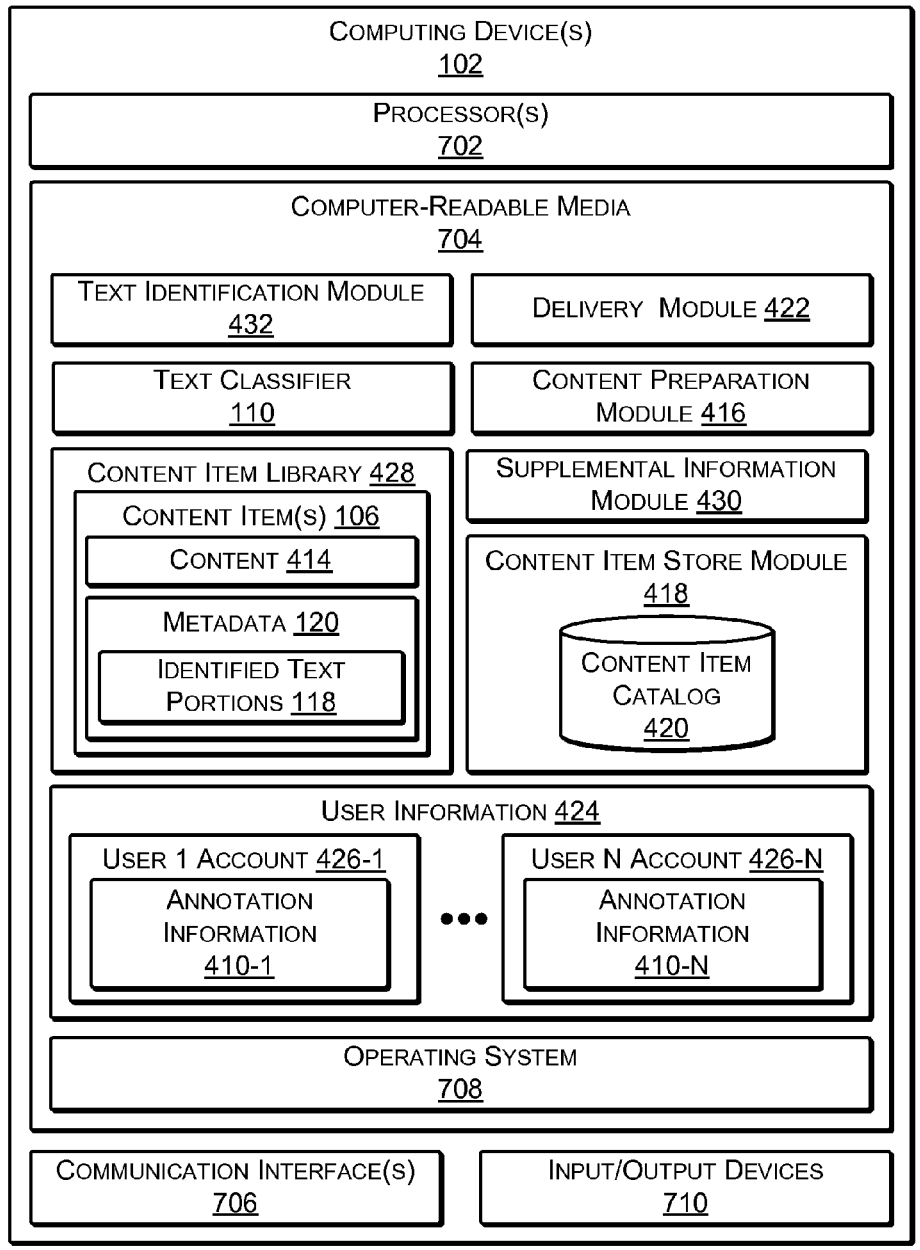
FIG. 7 illustrates select components of one or more example computing devices according to some implementations.

FIG. 7 illustrates select components of one or more computing devices 102 that may be used to implement the functionality described herein according to some implementations. The computing device(s) 102 may include one or more servers or other types of computing devices that may be embodied in any number of ways. For instance, in the case of a server, the computing device(s) 102 may be a single server, a cluster of servers, a server farm or data center, a cloud hosted computing service, and so forth, although other computer architectures (e.g., a mainframe architecture) may also be used. Further, while the figures illustrate the components of the computing device 102 as being present in a single location, it is to be appreciated that these components may be distributed across different computing devices and locations in any manner. Generally, the computing device 102 may be implemented by one or more computing devices, with the various functionality described above distributed in various ways across the different computing devices. The computing devices may be located together or separately, and organized, for example, as virtual servers, server banks and/or server farms. The described functionality may be provided by the computing devices of a single entity or enterprise, or may be provided by the computing devices and/or services of multiple entities or enterprises.

As illustrated in FIG. 7, an example computing device 102 includes one or more processors 702, one or more computer-readable media 704, and one or more communication interfaces 706. The processor(s) 702 may be a single processing unit or a number of processing units, and may include single or multiple computing units or multiple cores. The processor(s) 702 can be configured to fetch and execute computer-readable instructions stored in the computer-readable media 704 or other computer-readable media.

The computer-readable media 704 may include volatile and nonvolatile memory and/or removable and non-removable media implemented in any type of technology for storage of information, such as computer-readable instructions, data structures, program modules or other data. Such computer-readable media includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of the computing device 102, the computer-readable media 704 may be a type of tangible computer storage media and may be a non-transitory storage media.

The computer-readable media 704 may be used to store any number of functional components that are executable by the processors 702. In many implementations, these functional components comprise instructions or programs that are executable by the processors 702 and that, when executed, implement operational logic for performing the actions attributed above to the computing device 102. Functional components of the computing device 102 that may be executed on the processors 702 for implementing the various functions and features related to providing and correcting digital text, as described herein, include the text identification module 432 and the text classifier 110. Additional functional components stored in the computer-readable media 704 may include the delivery module 422, the content preparation module 416, the supplemental information module 430, the content item store module 418, and an operating system 708 for controlling and managing various functions of the computing device 102.

In addition, the computer-readable media 704 may include, or the computing device 102 may access, data, which may include the content item library 428 including one or more content items 106. The data may further include the content item catalog 420 and the user information 424. In addition, the computing device(s) 102 may include many other logical, programmatic and physical components, of which those described above are merely examples that are related to the discussion herein.

The communication interface(s) 706 may include one or more interfaces and hardware components for enabling communication with various other devices, such as the electronic devices 200 over the network(s) 404. For example, communication interface(s) 706 may facilitate communication through one or more of the Internet, cable networks, cellular networks, wireless networks (e.g., Wi-Fi, cellular) and wired networks. Various different approaches to implementations described herein can be implemented in various environments. For instance, the network(s) 404 may include any appropriate network, including an intranet, the Internet, a cellular network, a LAN, WAN, VPN or any other network or combination thereof. Components used for such a system can depend at least in part upon the type of network and/or environment selected. Protocols and components for communicating via such networks are well known and will not be discussed herein in detail.

Computing device 102 may further be equipped with various input/output devices 710. Such I/O devices 710 may include a display, various user interface controls (e.g., buttons, mouse, keyboard, touch screen, etc.), audio speakers, connection ports and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Example Electronic Device

Figure 8:
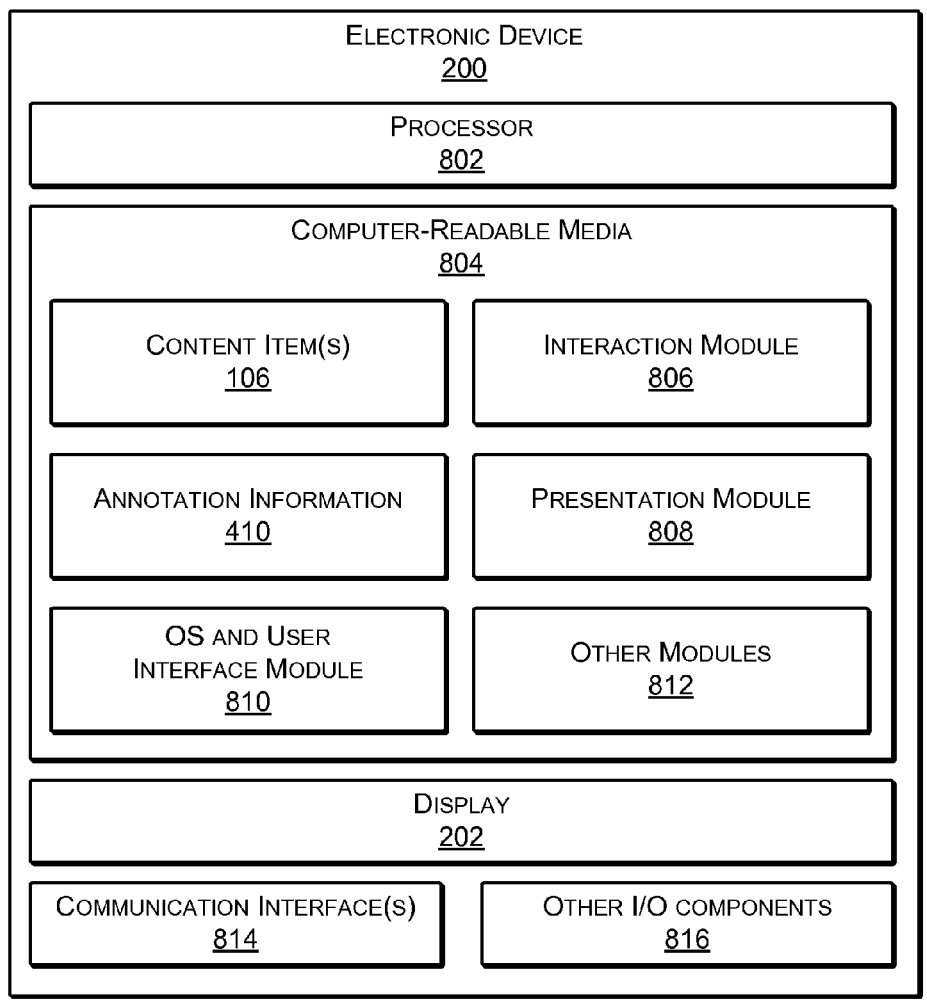
FIG. 8 illustrates select components of an example electronic device according to some implementations.

FIG. 8 illustrates select example components of the electronic device 200 that may be used to implement the functionality described above according to some implementations. In a very basic configuration, the electronic device 200 includes, or accesses, components such as at least one control logic circuit, central processing unit, or processor 802 and one or more computer-readable media 804. Each processor 802 may itself comprise one or more processors or processing cores. Depending on the configuration of the electronic device 200, the computer-readable media 804 may be an example of tangible non-transitory computer storage media and may include volatile and nonvolatile memory and/or removable and non-removable media implemented in any type of technology for storage of information such as computer-readable instructions, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processor 802 directly or through another computing device. Accordingly, the computer-readable media 804 may be computer-readable media able to store and maintain instructions, modules or components executable by the processor 802.

The computer-readable media 804 may be used to store any number of functional components that are executable by the processor 802. In some implementations, these functional components comprise instructions or programs that are executable by the processor 802 and that, when executed, implement operational logic for performing the actions attributed above to the electronic device 200. Functional components of the electronic device 200 stored in the computer-readable media 804 may include an interaction module 806, executable by the processor 802 for obtaining and presenting information related to content items 106, such as for presenting one or more interfaces 300 as discussed above. In some instances, the interaction module 806 may be an application, such as a web browser, mobile application, or other module or computer program configured to receive web content, webviews, online content, or the like, and for accessing and interacting with one or more modules of the content provider 402. For example, the interaction module 806 may enable a user 408 to receive the interface 300 while browsing or shopping for content items at the content provider site 406. The interaction module 806 may further enable the user 408 to access or receive content items 106 from the content provider site 406, such as by downloading through the network 404.

Additional functional components stored in the computer-readable media 804 may include a presentation module 808, which may be executed by the processor 802 for presenting one or more content items 106. Thus, the presentation module 808 may present the interface 204 discussed above with respect to FIG. 2. In some examples, the presentation module 808 and the interaction module 806 may be separate modules or applications. In other implementations, the presentation module 808 and the interaction module 806 may both be part of the same application or computer program for accessing and presenting content items 106 on the electronic device 200. In yet other implementations, the presentation module 808 and the interaction module 806 may represent different functionalities of the same module.

Other functional components may include an operating system and user interface module 810 for controlling and managing various functions of the electronic device 200. Depending on the type of the electronic device 200, the computer-readable media 804 may also optionally include other functional components, such as other modules 812, which may include applications, programs, drivers and so forth.

The computer-readable media 804 may also store data, data structures, and the like that are used by the functional components. For example, data stored by the computer-readable media 804 may include the one or more content items 106. In some examples, the electronic device 200 may further include the user annotation information 410 that is sent to the content provider, and which may include information for annotations made to each content item. In some examples, the annotation information 410 may be stored with the metadata of each content item 106, while in other examples, this information may be stored in a separate location. The electronic device 200 may also maintain other data, which may include, for example, data used by the interaction module 806, data used by the operating system and user interface module 810, and data used by the other modules 812. Further, the electronic device 200 may include many other logical, programmatic and physical components, of which those described are merely examples that are related to the discussion herein.

FIG. 8 further illustrates the display 202, which may be passive, emissive or any other form of display. In one implementation, the display uses electronic paper (ePaper) display technology, which is bi-stable, meaning that it is capable of holding text or other rendered images even when very little or no power is supplied to the display. Some examples of suitable ePaper displays that may be used with the implementations described herein include bi-stable LCDs, MEMS, cholesteric, pigmented electrophoretic, and others. In other implementations, or for other types of devices, the display 202 may be an active display such as a liquid crystal display, plasma display, light emitting diode display, organic light emitting diode display, and so forth. These displays may comprise drive electronics, such as a display drive matrix configured to affect individual pixels within the display 202. Additionally, in some implementations, the display 202 may be a 3D display capable of providing a 3D image. For example, the display 202 may produce a 3D image by providing alternating left-eye and right-eye images with or without the use of shuttering or filtering eyeglasses. Accordingly, in some implementations, the content items and user interface components herein may be rendered in 3D.

One or more communication interfaces 814 may support both wired and wireless connection to various networks, such as cellular networks, radio, WiFi networks, short-range or near-field networks (e.g., Bluetooth®), infrared signals, local area networks, wide area networks, the Internet, and so forth. For example, the communication interface 814 may allow a user of the electronic device 200 to access the World Wide Web, download content items from the content provider site 406, access online content, such as from a website or other network location, and the like. The communication interface 814 may further allow a user to access storage on another device, such as a user's computing device, a network attached storage device, cloud storage, or the like.

The electronic device 200 may further be equipped with various other input/output (I/O) components 816. Such I/O components may include a touchscreen and various user controls (e.g., buttons, a joystick, a keyboard, a mouse, etc.), speakers, a microphone, a camera, connection ports, and so forth. For example, the operating system 806 of the electronic device 200 may include suitable drivers configured to accept input from a keypad, keyboard, or other user controls and devices included as the I/O components 816. For instance, the user controls may include page turning buttons, navigational keys, a power on/off button, selection keys, and so on. Additionally, the electronic device 200 may include various other components that are not shown, examples of which include removable storage, a power source, such as a battery and power control unit, a global positioning system (GPS) device, a PC Card component, and so forth.

Example Processes

Figure 10:
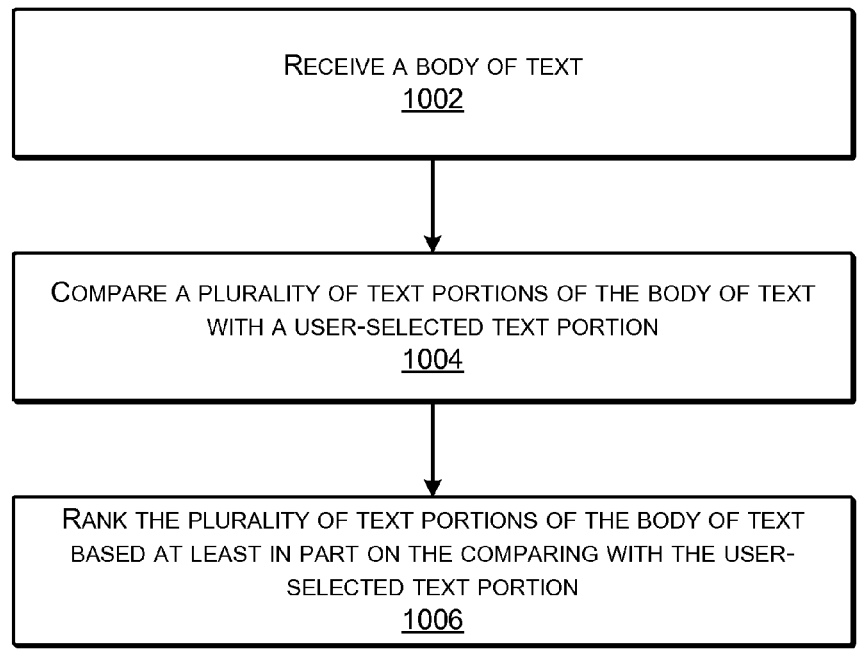
FIG. 10 is a flow diagram illustrating an example process to identify text predicted to be of interest to users according to some implementations.
Figure 11:
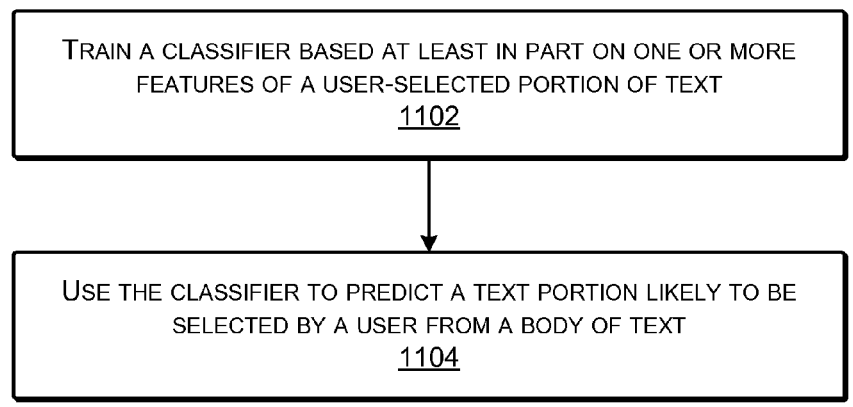
FIG. 11 is a flow diagram illustrating an example process to identify text predicted to be of interest to users according to some implementations.

FIGS. 9-11 are flow diagrams illustrating example processes to predict interesting text that may be selected by users according to some implementations. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 9 is a flow diagram illustrating an example process 900 to identify text predicted to be of interest to users according to some implementations. The process 900 may be performed by a computing device, such as one or more computing devices of a content provider or other entity.

At 902, the computing device may train a classifier based at least in part on training data that includes first text portions that have been identified by a plurality of users, the first text portions corresponding to a plurality of first content items. For example, the classifier may be trained using popular highlights or other annotations or user-selected portions of text for a plurality of content items.

At 904, the computing device applies the classifier to the text of a second content item, the text including a plurality of second text portions. As one example, the classifier may be applied to a content item that has not yet been annotated to determine which portions of the content item are likely to be selected by users for being annotated.

At 906, the computing device determines a ranking of the second text portions based at least in part on a similarity to the first text portions. For example, the classifier may determine a ranking of each sentence in the content item relative to one another based on similarity to the popular highlights text portions identified in the training data.

At 908, the computing device determines the similarity based at least in part on at least one of a similarity of sentence structure between the first text portions and the second text portions, or a similarity of a type of words used in the first text portions with a type of words used in the second text portions. For example, the classifier may identify a plurality of features of the first text portions that may be used for comparison with the second text portions, such as sentence structure or a similarity of a type of words used, along with synonyms for those words. The ranking is determined based on how similar the second text portions are to the training data, i.e., the more similar, the more highly ranked are the second text portions.

At 910, the computing device selects at least one second text portion from the second content item based on the ranking. For example, the computing device may select one or more of the text portions from the second content item that are most highly ranked for use in various applications such as for marketing of the content item, or for indicating to users one or more portions of the content item that are likely to be of interest.

FIG. 10 is a flow diagram illustrating an example process 1000 to identify text predicted to be selected by a user according to some implementations. The process 1000 may be performed by a computing device, such as one or more computing devices of a content provider or other entity.

At 1002, the computing device accesses or receives a body of text. For example, the body of text may be obtained from a content item or from another source of text such as from customer reviews, forum comments, or other textual content.

At 1004, the computing device compares a plurality of text portions of the body of text with a user-selected text portion. For example, the computing device may compare the body of text with one or more portions of content that have been selected by one or more users. In some examples, the text may be compared with popular annotations identified by a plurality of users for a plurality of content items.

At 1006, the computing device ranks the plurality of text portions of the body of text based at least in part on the comparing with the user-selected text portion. For example, the portions of text that compare most closely to the popularly annotated portions of the other content items may be ranked more highly than those text portions that bear lesser similarity.

FIG. 11 is a flow diagram illustrating an example process 1100 to identify text likely to be selected by a user according to some implementations. The process 1100 may be performed by a computing device, such as one or more computing devices of a content provider or other entity.

At 1102, the computing device trains a classifier based at least in part on one or more features of a user-selected portion of text. For example, the classifier may be trained based on a structure or other features of one or more portions of text that have been selected by users from other content items.

At 1104, the computing device uses the classifier to predict a text portion likely be selected by a user from a body of text. For example, after the classifier has been trained, the classifier may be applied to a content item or other body of text to determine which portions of the text are likely to be selected by a user, such as to be highlighted, annotated or quoted by the user.

Additionally, the example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. One or more computer-readable media maintaining instructions, which when executed by one or more processors, cause the one or more processors to perform operations comprising:
   accessing training data, the training data comprising:
   a first text portion from a first electronic book, the first text portion associated with a positive feedback through a first user interaction received by a first computing device associated with a first user, and
   a second text portion from a second electronic book, the second text portion associated with a negative feedback through a second user interaction received by a second computing device associated with a second user;
   training a classifier based at least in part on the training data;

applying the classifier to a text of a third electronic book, wherein the classifier:
assigns, to a third text portion of the text of the third electronic book and independent of annotation data associated with the third electronic book, a first score that indicates a probability that the third text portion will be annotated by future users,
assigns, to a fourth text portion of the text of the third electronic book and independent of annotation data associated with the third electronic book, a second score indicating a probability that the fourth text portion will be annotated by future users,
wherein the first score and the second score are assigned based at least in part on the positive feedback received through the first user interaction, the negative feedback received through the second user interaction, and at least one of:
a similarity to a sentence structure of the at least one of the first text portion or the second text portion, or
a similarity to at least one of a type of words used in the first text portion or a type of words used in the second text portion; and
determines a ranking of at least the third text portion and the fourth text portion of the third electronic book based at least in part on the first score and the second score; and
selecting at least one of the third text portion or the fourth text portion based at least in part on the ranking.

2. The one or more computer-readable media as recited in claim 1, wherein the ranking of the at least the third text portion and the fourth text portion of the third electronic book is based at least in part on whether individual text portions of the third electronic book are associated with at least one of:
a literary character mentioned in the third electronic book;
a person mentioned in the third electronic book;
a topic mentioned in the third electronic book;
an organization mentioned in the third electronic book;
a place mentioned in the third electronic book;
a thing mentioned in the third electronic book; or
a period of a setting mentioned in the third electronic book.

3. The one or more computer-readable media as recited in claim 1, wherein at least one text portion of the at least the third text portion and the fourth text portion of the third electronic book is a highest-ranked text portion of the at least the third text portion and the fourth text portion of the third electronic book, the operations further comprising including the highest ranked text portion in an interface offering access to the third electronic book.

4. The one or more computer-readable media as recited in claim 1, wherein at least one text portion of the at least the third text portion and the fourth text portion of the third electronic book is a highest-ranked text portion of the at least the third text portion and the fourth text portion of the third electronic book, the operations further comprising:
including an indication of the highest-ranked text portion in metadata associated with the third electronic book; and
sending the metadata to a user device to identify the highest-ranked text portion of the third electronic book.

5. The one or more computer-readable media as recited in claim 1, wherein the first text portion has been further identified based at least in part on:

receiving annotation information from a plurality of respective electronic devices corresponding to a plurality of users; and
for the first electronic book, based at least in part on the annotation information, determining that the first text portion has been annotated by the plurality of users more frequently than one or more other portions of text of the first electronic book.

6. A method comprising:
under control of one or more processors configured with executable instructions, receiving a content item comprising a first body of text, the first body of text comprising at least a first text portion and a second text portion;
training a classifier based at least in part on an annotated text portion of a second body of text, the annotated text portion having been associated with a first reason through a user interaction received by a computing device associated with a first user, wherein the first body of text is different from the second body of text, and wherein, once trained, the classifier is configured to assign scores indicating a probability that a corresponding portion of the first text portion will be annotated by a second user based on the annotated text portion of the second body of text;
assigning, using the trained classifier, and to the first text portion, a first score that indicates the probability that the first text portion will be annotated by the second user;
assigning, using the trained classifier, and to the second text portion, a second score that indicates the probability that the second text portion will be annotated by the second user, wherein the first score and the second score are assigned based at least in part on the annotated text portion;
ranking, based at least in part on the first score and the second score, the at least the first text portion and the second text portion of the first body of text;
And selecting at least one of the first text portion or the second text portion based at least in part on the raking.

7. The method as recited in claim 6, wherein the annotated text portion includes a portion of content that has been annotated by a plurality of users.

8. The method as recited in claim 7, wherein the portion of content has been annotated by at least one of:
highlighting the text portion;
writing a note associated with the text portion;
bookmarking the text portion; or
commenting on the text portion.

9. The method as recited in claim 6, wherein the annotated text portion is a portion of content that has been selected by the first user for posting to at least one of:
a social network site;
a microblog site; or
an online forum.

10. The method as recited in claim 6, wherein the first body of text is a user review of a plurality of user reviews, and the operations further include presenting the first body of text to the second user based at least in part on the first score.

11. The method as recited in claim 6, wherein the first body of text is a forum comment of a plurality of forum comments, and the operations further include presenting the first body of text to the second user based at least in part on the first score.

12. The method as recited in claim 6, wherein the annotated text portion includes a plurality of user-selected text portions, individual user-selected portions corresponding to an individual content item, the method further comprising:

comparing the at least the first text portion and the second text portion of the first body of text with the plurality of the user-selected text portions; and ranking the at least the first text portion and the second text portion of the first body of text based at least in part on the comparing with the plurality of user-selected text portions.

13. The method as recited in claim 6, wherein assigning the first score and the second score is based at least in part on comparing sentence structures of the at least the first text portion and the second text portion of the first body of text with a sentence structure of the annotated text portion.

14. The method as recited in claim 6, wherein assigning the first score and the second score is based at least in part on comparing words used in the at least the first text portion and the second text portion of the first body of text with words used in the annotated text portion.

15. The method as recited in claim 6, wherein the ranking the at least the first text portion and the second text portion of the first body of text is based at least in part on whether each text portion of the first body of text is associated with at least one of:
 a literary character mentioned in the content item;
 a person mentioned in the content item;
 a topic mentioned in the content item;
 an organization mentioned in the content item;
 a place mentioned in the content item;
 a thing mentioned in the content item; or
 a period of a setting mentioned in the content item.

16. The method as recited in claim 6, wherein the body of text is from a content item, the method further comprising sending information related to the ranking to an author of the content item.

17. The method as recited in claim 6, the method further comprising:
 receiving, via a user interface, a selection of a term from the content item, the term comprising at least one of:
  a literary character mentioned in the content item;
  a person mentioned in the content item;
  a topic mentioned in the content item;
  an organization mentioned in the content item;
  a place mentioned in the content item;
  a thing mentioned in the content item; or
  a period of a setting mentioned in the content item; and
 presenting at least one text portion corresponding to the selected term based at least in part on the ranking.

18. The method of claim 6, further comprising:
 identifying one or more names or one or more terms within the first body of text that are significant to the first body of text,
 determining that at least a name or term of the one or more names or one or more terms is associated with the first text portion; and
 storing an association between the first text portion and the at least one name or term of the one or more names or one or more terms.

19. The method of claim 18, wherein identifying the one or more names or one or more terms comprises accessing a network accessible resource, and identifying the one or more names or the one or more terms based at least in part on the network accessible resource.

20. The method of claim 18, further comprising:
 receiving a user selection corresponding to the at least one name or term; and presenting the first text portion based at least in part on the user selection and the association.

21. A system comprising:
 one or more processors;
 one or more computer-readable media; and
 one or more modules maintained on the one or more computer-readable media that, when executed by the one or more processors, cause the one or more processors to perform operations including:
  accessing training data, the training data comprising one or more features of a first portion of text from within a first body of text, the first portion of text having been selected through a first user interaction received by a first computing device associated with a first user;
  training a classifier based at least in part on the accessed training data, wherein, once trained, the classifier is configured to assign scores indicating a probability that a corresponding portion of a second body of text will be annotated by a second user based on the first portion of text having been selected through the first user interaction;
  identifying a third portion of text and a fourth portion of text from within the second body of text;
  using the classifier to assign to the third portion of text a first score that indicates a probability that the third portion of text portion will be annotated by future users;
  using the classifier to assign to the fourth portion of text a second score that indicates a probability that the fourth portion of text portion will be annotated by future users, wherein the first score and the second score are assigned by the classifier based at least in part on the first user interaction;
  ranking the third portion of text and the fourth portion of text based at least in part on the first score and the second score; and
  identify the fourth portion of text, the fourth portion of text being identified based at least partly on the ranking.

22. The system as recited in claim 21, wherein the second body of text is from a content item, the operations further comprising:
 receiving, from an electronic device, an indication of a text portion from within the second body of text which has been selected from within the content item; and
 using the indication to further train the classifier.

23. The system as recited in claim 21, wherein the one or more features include a sentence structure of the first portion of text.

24. The system as recited in claim 21, wherein the one or more features include at least one of:
 words used in the first portion of text, and
 synonyms of the words used in the first portion of text.

25. The system as recited in claim 21, wherein the first portion of text is identified from annotation information received from a plurality of electronic devices.

26. The system as recited in claim 25, wherein the annotation information identifies user annotations including at least one of:
 highlighting the first portion of text;
 writing a note associated with the first portion of text;
 bookmarking the first portion of text; or
 commenting on the first portion of text.

27. The system as recited in claim 21, wherein the first portion of text is identified from requests, received from a plurality of electronic devices, to post a portion of a content item to at least one of:
- a social network site;
- a microblog site; or
- an online discussion forum.

28. The system as recited in claim 21, wherein a determination of the first portion of text is based at least in part on analysis of at least one user comment related to the first portions of text.

\* \* \* \* \*